United States Patent [19]

Freund et al.

[11] Patent Number: 4,816,330

[45] Date of Patent: Mar. 28, 1989

[54] CHEMICAL RESISTANT LAMINATED GARMENT MATERIAL

[76] Inventors: Paul X. Freund, 315 E. Grandview Ave., Zelienople, Pa. 16063; Zane N. Frund, Jr., 3784-G Logans Ferry Rd., Pittsburgh, Pa. 15239

[21] Appl. No.: 89,426

[22] Filed: Aug. 26, 1987

[51] Int. Cl.$^4$ .................. B32B 27/08; B32B 31/06
[52] U.S. Cl. ........................... 428/286; 2/2; 2/243 A; 428/287; 428/422
[58] Field of Search .................. 428/286, 287, 422

[56] References Cited

U.S. PATENT DOCUMENTS

| | | | |
|---|---|---|---|
| 2,539,329 | 1/1951 | Sanders | 428/268 |
| 3,547,765 | 12/1970 | Snyder | 428/422 |
| 3,928,703 | 12/1975 | Cook | 428/268 |
| 4,133,927 | 1/1979 | Tomoda et al. | 428/291 |
| 4,214,321 | 7/1980 | Nuwayser | 428/421 |
| 4,610,918 | 9/1986 | Effenberger et al. | 428/262 |
| 4,645,709 | 2/1987 | Klare | 428/251 |
| 4,702,956 | 10/1987 | Wilson et al. | 428/422 |
| 4,714,650 | 12/1987 | Obayashi et al. | 428/422 |
| 4,731,283 | 3/1988 | Sakane et al. | 428/422 |
| 4,770,927 | 9/1988 | Effenberger | 428/251 |

*Primary Examiner*—James C. Cannon
*Attorney, Agent, or Firm*—Douglas K. McClaine

[57] ABSTRACT

A chemical resistant garment material, that is a laminate formed from layers of skived Teflon that have been adhered to a cloth substrate, for use in protective clothing to guard against exposure to toxic agents.

6 Claims, 1 Drawing Sheet

CHEMICAL RESISTANT LAMINATED GARMENT MATERIAL

FIELD OF THE INVENTION

This invention is related to the field of material for use as protective clothing.

BACKGROUND OF THE INVENTION

This invention relates to laminated materials, suitable for use as materials for protective clothing, to guard against hazardous material (hazmat) exposure. One hazard that a hazmat cleanup specialist is confronted with is the exposure to and subsequent skin contact with toxic chemicals or materials.

Various protective clothings are known in the art to prevent skin contact with toxic agents. Some of this clothing is made out of laminated materials such as the material described in Nuwayser, U.S Pat. No. 4,214,321 and Athey, Jr., U.S. Pat. No. 4,588,646. The purpose of using a laminate material is to create a composition that contains the most desirable properties of the individual layers. For example, a material may be a composite of a chemically resistive barrier; to prohibit the passage of a chemical through the material and, a substrate material that strengthens the chemical resistive barrier so that the composite can be used to make clothing garments.

Various laminates have been created to provide protection from chemicals having a variety of properties. For example, the Mine Safety Appliances Company (MSA) of Pittsburgh, Pennsylvania sells two different protective suits. The first suit is comprised of a three-layer material of Viton ® on a nylon substrate on neoprene. This suit is used for cleanups of spills such as, for example, benzene or gasoline. The second type of suit manufactured by MSA is comprised of a three-layer material of butyl on polyester on neoprene. This laminate composition is effective for use in cleaning spills such as acetone or chlorine.

Other types of laminates known in the art are comprised of layers that are individually laminated or coated with a chemical resistive polymer material. Examples of such coated laminates are Snyder, U.S. Pat. No. 3,547,765, Effenberger et al. U.S. Pat. No. 4,610,918 and the abandoned application of Effenberger et al., Ser. No. 599,766, filed Apr. 13, 1984. In each of these disclosures, a substrate material is coated with a copolymer that adheres to a substrate. The process of coating the substrate necessarily requires numerous production steps resulting in high production costs. It is also difficult to maintain quality in producing the materials in that the coated material is susceptible to the formation of pin holes and breakthroughs in the polymer coating. Pin hole formation can result in leaks and the subsequent breakthrough of the laminate material causing possible skin exposure to the toxic agents. The Snyder patent and the Effenberger patent discloses the use of polytetrafluoroethylene (PTFE) either as a substrate material or a coating material. Polytetrafluoroethylene, sold under the E. I. DuPont de Nemours trademark Teflon ®, is a well known coating material used to reduce friction on household items and in industrial applications. However, although Teflon has exhibited good resistance to chemical degradation, it displays poor permeation resistance qualities.

The process of forming Teflon into sheets is known as skiving. Teflon is particularly effective against chemical permeation when it is formed from skived rolls. Skived Teflon sheets are virtually pin hole free and accordingly, chemical permeation normally occurs only as the Teflon layer breaks down from cracking that develops from abrasions of the layer. Teflon coated fabrics such as those disclosed in the Snyder and Effenberger references do not possess the same permeation resistive qualities as the solid skived Teflon layers since Teflon coated materials often inherently contain pin holes and cracks. Accordingly, it would be desirable to provide a laminate material that has a chemical barrier comprised of at least one layer of skived Teflon.

SUMMARY OF THE INVENTION

The present invention provides a material that can be used for protective clothing for use by hazmat personnel to provide protection against exposure to toxic chemicals. The material is comprised of a laminate layer of skived Teflon bonded by means of an adhesive to a substrate material. For greater permeation resistance, a second layer of skived Teflon can be bonded to the opposite side of the substrate. The skived Teflon layer provides permeation resistance to a broad spectrum of hazmat materials while the substrate layer provides strength and support to the laminate so that the material can be manufactured into clothing garments.

The present invention differs from the materials disclosed in the Snyder and Effenberger references in that the prior art references use Teflon as a coating material rather than as a laminate layer. The coating process requires more manufacturing process yet provides a Teflon barrier that is more susceptible to permeation than the skived Teflon layers.

DETAILED DESCRIPTION OF THE PREFERRED EMBODIMENT

Figure 1:
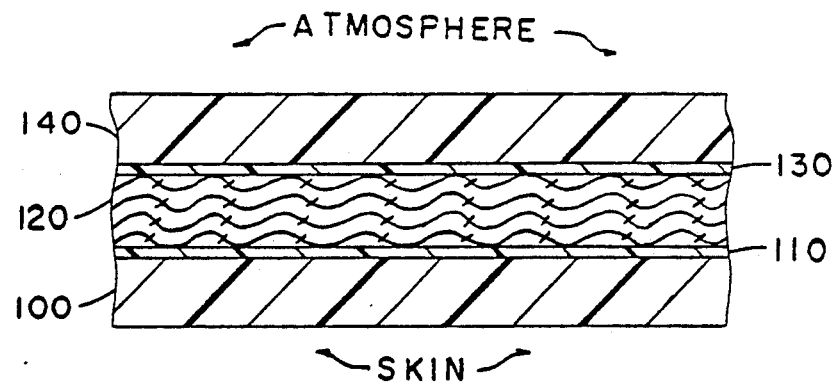
FIG. 1 is a cross-sectional view of the laminate material having a substrate material sandwiched between two skived Teflon layers.

Referring to FIG. 1 there is shown a cross-sectional view of the first arrangement of the laminate material. In this arrangement, the laminated layer 100 closest to the wearer's skin is a skived Teflon. Skiving is a specialized process for producing films of sheeting by skiving off thin layers from large blocks of solid Teflon. A continuous film or sheet of Teflon is obtained by skiving the thin layers off in a lathe.

The first skived Teflon layer 100 is adhesively bonded to a substrate layer 120. The bonding adhesive layer 110 can be, for example, a thermosetting resin such as resorcinal phenolic as described in *Modern Plastic Encyclopedia* 1986–87, McGraw-Hill, No. 10A, Volume 63, Page 350. The skived Teflon layer is of a preferred thickness of approximately 0.002 in.

The substrate layer 120 is a cloth material of a preferred thickness of 0.01 to 0.02 in. The substrate layer 120 provides strength to the skived Teflon layer 100 to inhibit tearing or stretching of the skived Teflon layer 100. The substrate layer 120 may be comprised of, for example, Tyvek, a spun bonded olefin; Cerex, a spun-bonded one hundred percent nylon 6.6; Nomex, a long chain polyamide; or, spun laced Nomex, a long chain polyamide that is spun rather than woven. The substrate material must be sufficiently pliable and drapeable to enable the laminate to be manufactured into protective garments.

On the opposite side of the substrate layer 120, and in contact with the atmosphere, is a second skived Teflon layer 140. The second skived Teflon layer 140 is of a preferred thickness of approximately 0.002 and is bonded to the substrate layer 120 by a second adhesive bonding layer 130. The second adhesive bonding layer 130 is also a thermosetting resin such as resorcinal phenolic.

The second skived Teflon layer 140 is the first barrier of defnese against chemical permeation through the garment. In the event that a toxic chemical should permeate the skived Teflon layer 140, the skived Teflon layer 100 acts as a second barrier against the chemical to prevent skin contact with the chemical.

Another advantage of using skived Teflon layers or laminates is that the skived Teflon layers can be heat sealed around the substrate and upon one another. The ability to heat seal the skived Teflon enables the material to be used to form total encapsulating protective suits without sewn or stitched seams. The elimination of seams eliminates a potential breakthrough area.

Figure 2:
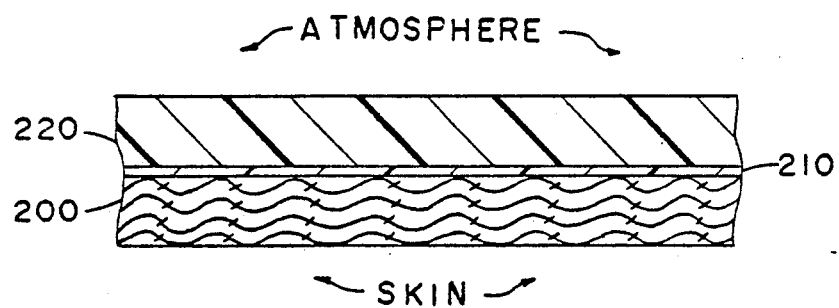
FIG. 2 is a cross-sectional view of the laminate material having a skived Teflon layer bonded to a substrate material.

Referring now to FIG. 2, a second arrangement of a skived Teflon laminate is shown. This arrangement is comprised of two laminate layers. The first layer 200 next to the wearer's skin is a substrate layer. As in the aforementioned first arrangement, the substrate layer 200 is of a preferred thickness of 0.01 to 0.02 in., and can be comprised of, for example, Tyvek, a spun bonded olefin; Cerex, a spun bonded one hundred percent nylon 6.6; Nomex, a long chain polyamide; or, spun laced Nomex, a long chain polyamide that is spun rather than woven. Again, the substrate material must be sufficiently pliable to enable the laminate to be manufactured into protective garments. In this arrangement, the substrate surface next to the wearer's skin should be suitably prepared so as to prevent abrasion of the skin.

The laminate layer 220 exposed to the atmosphere is a skived Teflon layer of a preferred thickness of approximately 0.002 in. The skived Teflon layer 220 is the sole barrier against toxic chemical permeation and is bonded to the substrate layer 200 by an adhesive bonding layer 210 comprised of, for example, a thermosetting resin such as resorcinal phenolic.

The two-layers laminate shown in FIG. 2 is less expensive since less skived Teflon is used in manufacturing. Protective garments using only one layer of Teflon would be used in situations in which the wearer would be susceptible to unanticipated chemical splashes rather than prolonged contact with the chemical. In situations where the user may be occasionally splashed, the level of protection can be lessened.

In in situations such as chemical spill clean-ups the suit may be exposed to continuous contact with the chemical. In this situation, the three-layer laminate would be more desirable since a second layer of skived Teflon is present to act as a second chemical barrier in the event that the chemical breaks through the outer layer due to penetration of the layer caused by cracking due to abrasion.

The following chart shows permeation resistance testing results for skived Teflon alone and skived Teflon on Nomex on skived Teflon.

| PERMEATION RESISTANCE TESTING PER ASTM STANDARD F739 | | | |
|---|---|---|---|
| Chemical | Type | Breaktime (min) | Comments |
| Skived Teflon (2 mil) | | | |
| THF | Liquid | 240+ | No Visible Damage |
| MEK | Liquid | 240+ | No Visible Damage |
| Benzene | Liquid | 240+ | No Visible Damage |
| Ethyl Acrylate | Liquid | 240+ | No Visible Damage |
| Skived Teflon/S.L. Nomex/Skived Teflon | | | |
| THF | Liquid | 240+ | No Visible Damage |
| MEK | Liquid | 240+ | No Visible Damage |
| Benzene | Liquid | 240+ | No Visible Damage |
| Ethyl Acrylate | Liquid | 240+ | No Visible Damage |

(Testing discontinued after four-hour period).

The material has been described in the preferred embodiments. There are numerous modifications and variations of the present invention that are made possible by the above teachings. It is therefore to be understood that the invention may be practiced otherwise than specifically described herein while still remaining within the scope of the appended claims.

What is claimed is:

1. A laminate material suitable for use in protective clothing comprising:
   a. a first layer of skived polytetrafluoroethylene; and,
   b. a second layer bonded through an adhesive layer to said first layer comprising a pliable non-coated cloth substrate.

2. A laminate material according to claim 1 where said second layer is a spun bonded olefin; a spun bonded one hundred percent nylon 6.6; or, a long chain polyamide.

3. A laminate material according to claim 1 having a third layer of skived polytetrafluoroethylene bonded to said second layer through an adhesive layer.

4. Clothing garments for use as protection against chemical exposure made from a laminate material comprising:
   a. a first layer of skived polytetrafluoroethylene; and,
   b. a second layer bonded through an adhesive layer to said first layer comprising a pliable non-coated cloth substrate.

5. Clothing garments according to claim 4 where said second layer is a spun bonded olefin; a spun bonded one hundred percent nylon 6.6; or, a long chain polyamide.

6. Clothing garment according to claim 4 having a third layer of skived polytetrafluoroethylene bonded to said second layer through an adhesive layer.

* * * * *